Feb. 4, 1941.  R. SCHNEIDER  2,230,764
LAWN MOWER SHARPENER
Filed Sept. 4, 1940   2 Sheets-Sheet 1
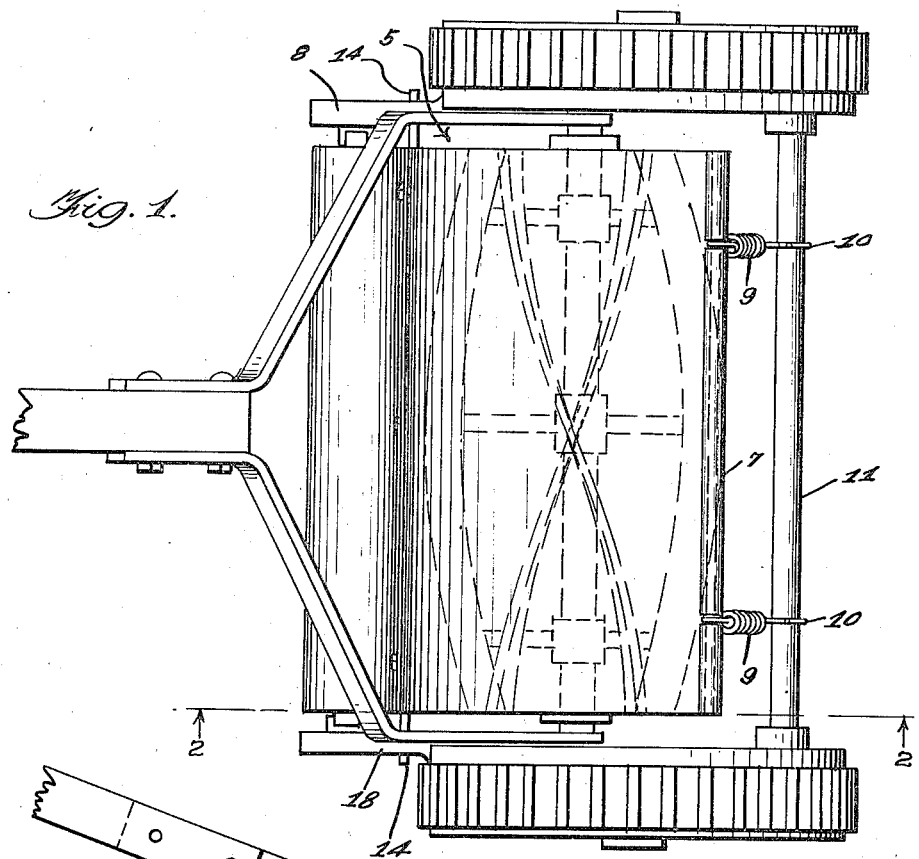
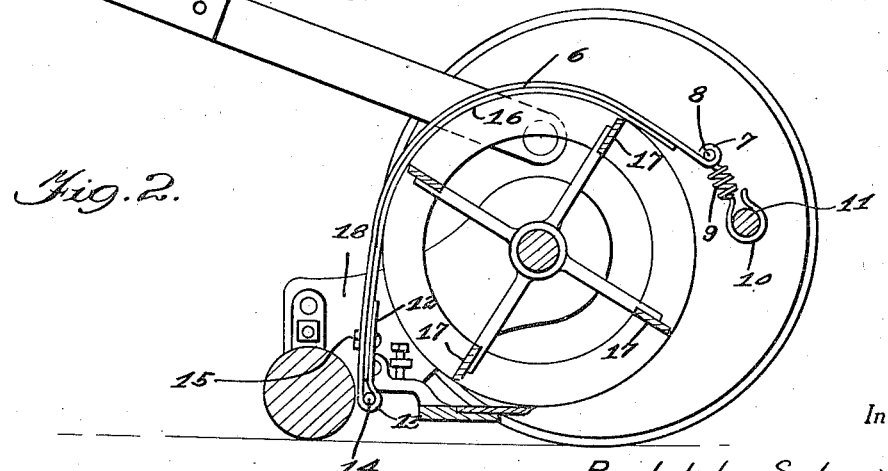
Inventor
Rudolph Schneider
By Clarence A. O'Brien
Attorney Feb. 4, 1941. R. SCHNEIDER 2,230,764
LAWN MOWER SHARPENER
Filed Sept. 4, 1940 2 Sheets-Sheet 2
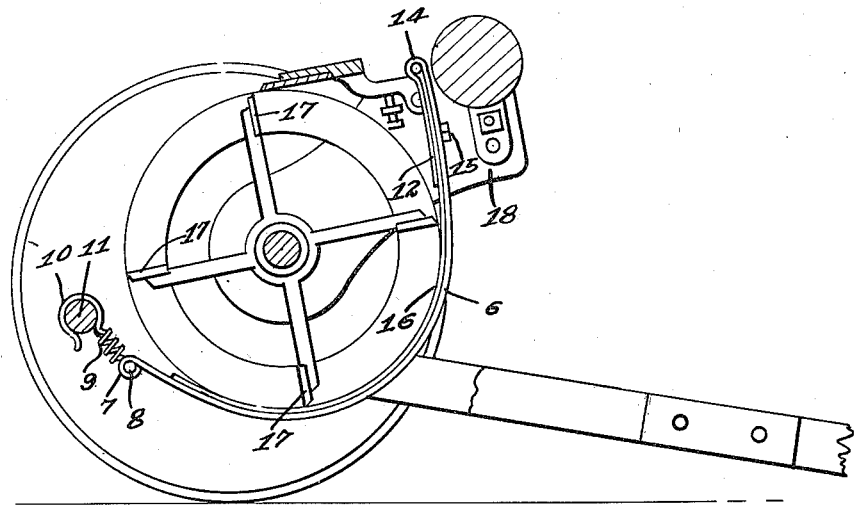
Fig. 3.
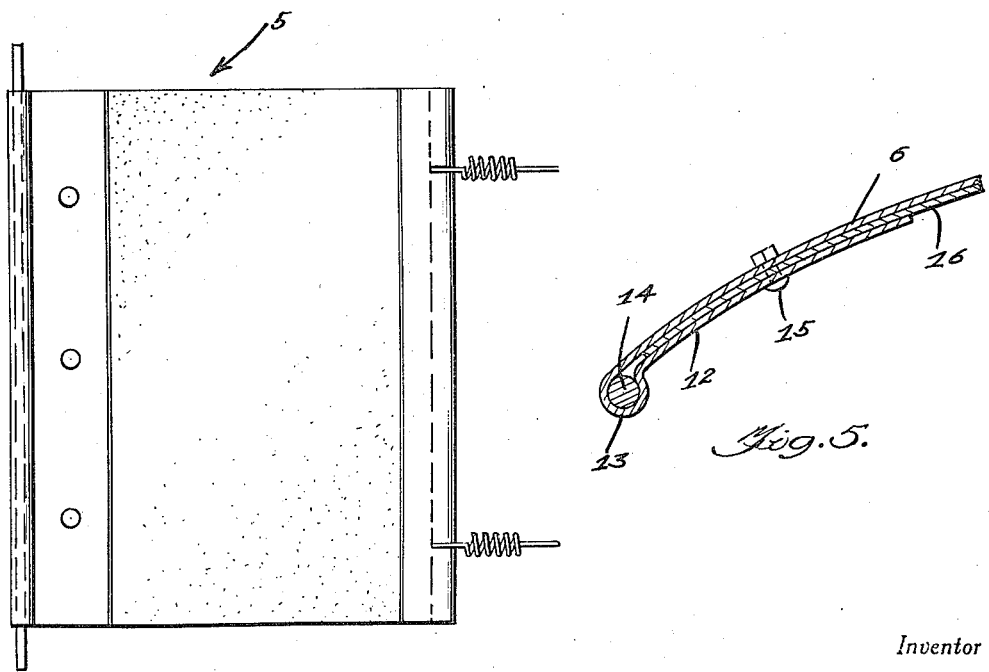
Fig. 4.
Fig. 5.
Inventor
Rudolph Schneider
By Clarence A. O'Brien
Attorney Patented Feb. 4, 1941

2,230,764

UNITED STATES PATENT OFFICE 2,230,764

LAWN MOWER SHARPENER

Rudolph Schneider, Milwaukee, Wis.

Application September 4, 1940, Serial No. 355,385

2 Claims. (Cl. 51—250)

This invention relates to devices for sharpening lawn mowers and an object of the invention is to provide a device of this character that is extremely simple in construction and can be readily applied to the mower and without requiring a great deal of skill, either in the application thereof to the mower or in the use thereof for sharpening the blades of the mower.

The invention together with its objects and advantages will be best understood from a study of the following description taken in connection with the accompanying drawings wherein:

Figure 1 is a plan view illustrating the application of the invention.

Figure 2 is a vertical sectional view through the mower taken substantially on line 2—2 of Figure 1 and further illustrating the application of the invention to the mower.

Figure 3 is a sectional view through the mower in an upside down position, and with the sharpener applied thereto, and illustrating the manner in which the sharpener is used.

Figure 4 is a plan view of the sharpener, and

Figure 5 is a fragmentary detail sectional view through the sharpener.

Referring more in detail to the drawings it will be seen that in the preferred embodiment thereof the sharpener, indicated generally by the reference numeral 5, embodies a flexible plate 6 of metal or any other suitable material and has a rolled edge 7 in which a reinforcing rod 8 is secured.

Springs 9 have one end thereof suitably engaged about the rod 8, the rolled edge 7 of the body plate 6 being suitably slit to accommodate said ends of the springs. At the free ends thereof the springs 9 are formed with integral hooks 10 adapted to engage over the transverse brace rod 11 of the mower as shown.

At the edge thereof remote from the rolled edge 7 the body plate 6 is folded back upon itself as at 12 and at the fold 13 presents an integral tube that slidably receives a retaining rod 14.

The folded edge 12 of the plate 6 is secured by bolts, rivets, or other fastening elements 15 to the body plate 6, and clamped between the body of the plate 6 and its edge 12 is an edge portion of an abrasive sheet 16. Sheet 16 may be of emery cloth, grit paper, or any other suitable abrasive fabric.

In mounting the device on the mower hooks 10 are engaged with the transverse brace bar 11 as shown and the body plate 6, and associated parts then trained over and drawn tightly down against the blades 17 of the mower after which the retaining rod 14 is passed through the tubular formation 13, with the respective opposite and protruding ends of the bar 14 engaging against the undersides of the roller supporting bars 18 of the mower as best shown in Figures 2 and 3.

It will be apparent that with the device thus applied to the mower springs 9 will exert a pull on the body plate 6 serving to maintain the abrasive sheet 16 in contact with the blades 17.

After the sharpener has been thus applied to the mower, the same is placed in the upside down position suggested in Figure 3. With the mower in this inverted position it is pushed forward or drawn backward and the consequent rotation of the reel carrying the blades 17 causes the latter to come into grinding contact with the abrasive sheet 16 whereby the blades, in a quick and efficient manner, are ground or sharpened.

It is thought that a clear understanding of the construction, manner of applying the invention, and advantages of the same will be had without a more detailed description thereof.

Having thus described the invention what is claimed as new is:

1. A lawn-mower sharpener comprising a flexible plate having a suitable abrading surface on one side thereof, resilient means at one end edge of the plate for attachment to the transverse brace bar of the mower, and a retaining bar slidably associated with the plate at the edge thereof remote from said resilient means, and said bar adapted to engage against the roller-supporting elements of the mower for retaining the plate in a position substantially concentric to the blade-carrying reel of the mower and with the abrading surface of said plate in yielding and effective contact with the blades of the mower.

2. In a sharpener for lawn mowers, a flexible body plate having on one face thereof an abrasive surface, hooks for securing one end edge of the plate to a part of the mower, springs connecting said hooks with said one edge of the plate; said plate at a relatively opposite edge having a tubular formation, and a retaining bar slidably accommodated in said tubular formation and of a length in excess of the width of the plate for engaging opposite portions of the frame of the mower for coacting with said hooks in securing the sharpener in position.

RUDOLPH SCHNEIDER.